US005149033A

United States Patent [19]

Burzler

[11] Patent Number: 5,149,033

[45] Date of Patent: Sep. 22, 1992

[54] EXTREMITY SUPPORT APPARATUS

[76] Inventor: Donald R. Burzler, Rolling Hills Farm, Rt. #1, Box 245, Buena Vista, Tenn. 38318

[21] Appl. No.: 674,697

[22] Filed: Mar. 25, 1991

Related U.S. Application Data

[63] Continuation-in-part of Ser. No. 478,582, Feb. 12, 1990, abandoned.

[51] Int. Cl.[5] .......... F16M 11/00

[52] U.S. Cl. .......... 248/176; 248/118

[58] Field of Search .......... 248/174, 176, 118, 118.1, 248/118.3, 118.5, 158, 346; 5/443, 496, 498; D24/64; 269/32 B; 128/80 R

[56] References Cited

U.S. PATENT DOCUMENTS

| | | | |
|---|---|---|---|
| 443,839 | 12/1890 | Steinhauer | 248/118 |
| 1,376,280 | 4/1921 | James | 248/118 |
| 2,850,342 | 9/1958 | Robinson | 269/328 |
| 2,960,151 | 11/1960 | Fairgrieve | 5/443 |
| 3,104,446 | 9/1963 | Throop, Jr. | 5/443 |
| 3,284,817 | 11/1966 | Landwirth | 5/431 |
| 3,345,656 | 10/1967 | Steinman | 248/118 |
| 3,832,743 | 9/1974 | Smith | 5/496 |
| 3,939,829 | 2/1976 | Spann | 5/443 |
| 3,946,451 | 3/1976 | Spann | 5/443 |
| 3,949,435 | 4/1976 | Dionne | 5/431 |
| 3,995,846 | 12/1976 | Frick | 269/328 |
| 4,090,268 | 5/1978 | Turner | 297/438 |
| 4,576,351 | 3/1986 | Brink | 248/118 |

FOREIGN PATENT DOCUMENTS

| | | | |
|---|---|---|---|
| 1257748 | 2/1961 | France | 5/498 |
| 1270443 | 7/1961 | France | 269/328 |
| 602056 | 7/1978 | Switzerland | 5/443 |
| 314254 | 6/1929 | United Kingdom | 5/498 |

*Primary Examiner*—David L. Talbott
*Attorney, Agent, or Firm*—Victor E. Libert

[57] ABSTRACT

A support apparatus (1) for one or both of a user's extremities, e.g., feet, includes a vertically extending elevation member (10), which optionally comprises a stationary member (36) and an extension member (34) to allow for height adjustment and which has an elevated support surface (14) upon which the user can place his or her foot or feet. The elevated member may be adapted to receive one or two of the user's extremities (e.g., legs) in arcuate depressions (14*a*, 14*c*, 14*d*) in the support surface (14). A footing member (12) provides an extended support for the elevation member (10) and a surface on which the user's unelevated foot can be placed. The elevation member (10) may be attached to the footing member (12) off-center, so that, by rotating the apparatus 180 degrees about a substantially vertical center axis (V—V) of the footing member (12), the effective distance of the elevation member (10) relative to the user can be altered. Securement straps (16*a*–16*h*) may be connected to the footing member (12) for fastening the apparatus to a supporting structure, e.g., a bed or footstool, and cover sheets (30*a*, 30*b*) may be provided to protect the supporting structure in the vicinity of the apparatus (1). The apparatus may also include an adjustment wedge member (50) to raise or tilt the elevation member (10) as desired.

20 Claims, 6 Drawing Sheets

FIG. 4
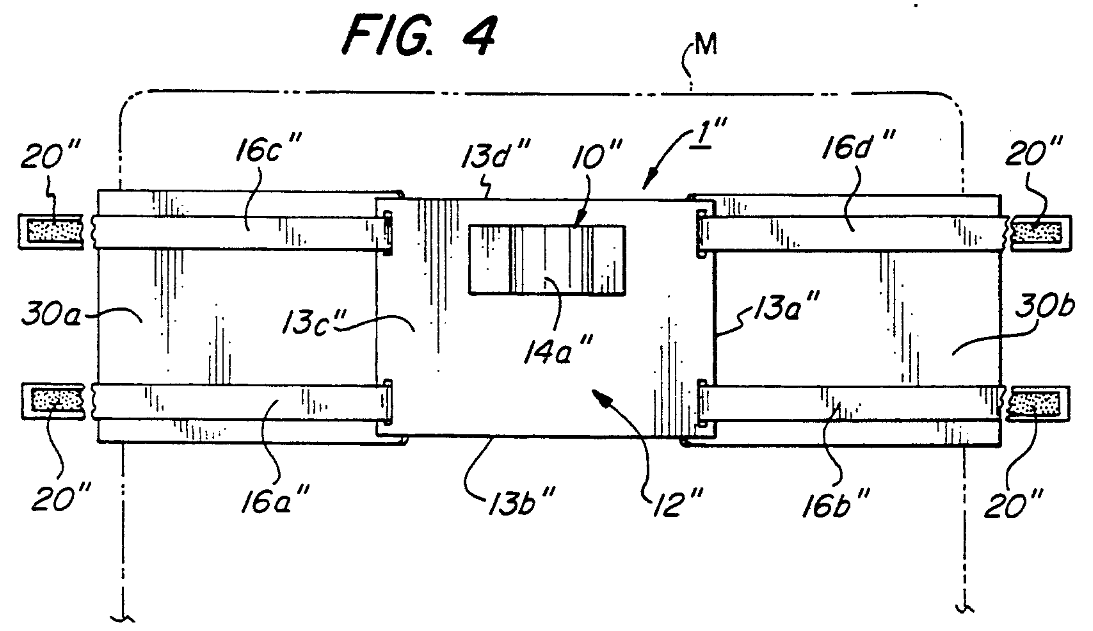
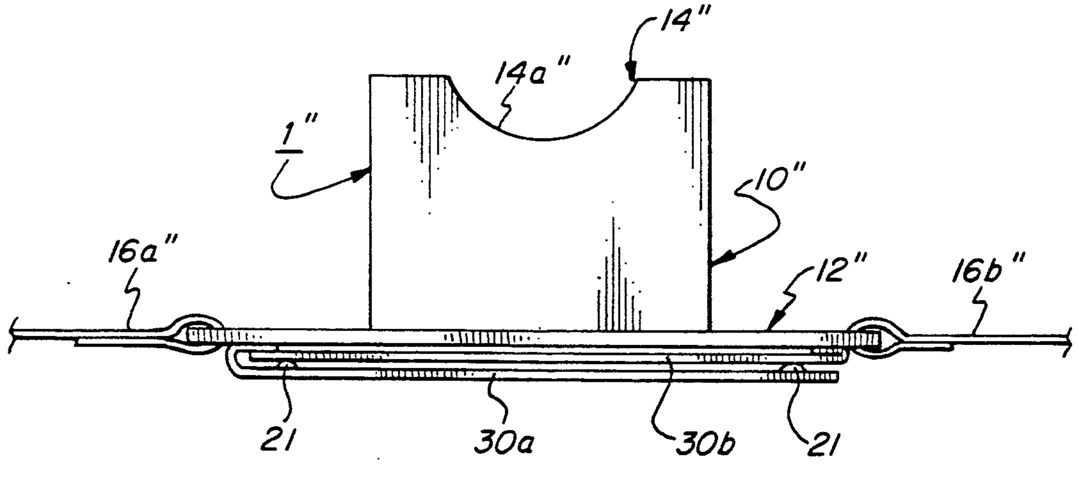
FIG. 5

EXTREMITY SUPPORT APPARATUS

RELATED APPLICATION

This application is a continuation-in-part of copending application Ser. No. 07/478,582 filed Feb. 12, 1990 now abandoned.

BACKGROUND OF THE INVENTION

1. Field of the Invention

This invention relates to a support apparatus, specifically to a support apparatus which is useful for supporting one or both of a user's extremities in an elevated position.

2. Description of Related Art

Various types of human extremity support apparatus are known in the art. U.S. Pat. No. 2,960,151 to Fairgrieve shows a footrest comprising a padded base and having a pair of adjustable leg means 31A and 31B which provide a frame over which bed clothing may be supported to protect the patient's foot or feet. A stabilizer member 30 is rotatable about a fastening screw 29 to stabilize and support the device, and V-shaped troughs 23 (FIG. 4) are provided in the cushion member so as to effectively support the patient's heel or heels.

U.S. Pat. No. 3,284,817 to Landwirth shows a resilient cushion encased within an impermeable sheet, such as a vinyl plastic sheet, and having a circumferential band 36 which provides both a carrying handle and a support for the user's limb. A second web or strap 40 (FIG. 5) may be attached to band 36 to hold the user's limb securely to the support device.

U.S. Pat. No. 3,995,846 to Frick shows a box-like support device including an open rectangular framework 11 (FIG. 1) over which a generally L-shaped support pad 25 is fitted by means of Velcro® straps. The support pad 25 may have a recess 29 formed therein to receive a user's foot as illustrated in FIG. 2.

U.S. Pat. No. 3,949,435 to Dionne shows a saddle-shaped support frame covered with a removable, resilient supportive material on which a patient may be supported as illustrated in FIG. 5.

U.S. Pat. No. 4,090,268 to Turner illustrates a support member for a user's feet which may be fitted with straps 15 (FIG. 4) for securement to a chaise lounge C.

U.S. Pat. No. 3,104,446 to Throop, Jr. discloses a foot positioner apparatus useful in the funeral service field and comprising a rigid bar member containing a pair of spaced-apart V-shaped portions 35, 36 for receiving the deceased's limbs.

SUMMARY OF THE INVENTION

In accordance with the present invention, there is provided a support apparatus for supporting at least one of a user's extremities in an elevated position, which comprises a vertically extending elevation member terminating at its upper end in an elevated support surface and at its lower end in a base portion, a footing member extending transversely of and outwardly from the base portion of the elevation member to stabilize the footing of the elevation member, and securement means attached to the support apparatus, the securement means being dimensioned and configured to fasten the support apparatus to a supporting structure.

According to one aspect of the instant invention, the support apparatus may comprise a vertically extending elevation member terminating at its upper end in an elevated support surface and at its lower end in a base portion, adapted to receive two extremities side by side, and a footing member extending transversely outwardly from the base portion of the elevation member. The footing member may have opposite transverse edges disposed on respective opposite sides of the elevation member with one transverse edge proximate to, and one transverse edge being remote from, the user of the apparatus. The elevation member is located closer to one of the transverse edges of the footing member than the other, so that by rotating the apparatus 180 degrees about a vertical center axis of the footing member, the distance between the elevation member and the transverse edge which is proximal to the user is altered.

According to another aspect of the instant invention, the support apparatus may further comprise a securement means dimensioned and configured to fasten the apparatus to a supporting structure. The securement means comprises a plurality of straps having mating connectors thereon, and may be attached to the footing member.

According to still another aspect of the instant invention, the elevation member may comprise a stationary member and an extension member, and the extension member may comprise a substantially block-shaped member.

The elevated support surface of the elevation member may have the shape of a single arcuate depression for receiving one of the user's extremities, or may have dual arcuate depressions for receiving two of the user's extremities.

According to yet another aspect of the instant invention, the support apparatus further comprises an adjustment wedge member, which may have a nonrectangular quadrilateral cross section and which may be equipped with recesses to receive the securing means.

Another aspect of the present invention provides that the support apparatus includes a cover means comprising a gatherable sheet material attached to the support apparatus and extendible outwardly of the footing member to cover, at least in the vicinity of the apparatus, a supporting structure on which the apparatus is placed. The cover means may be attached to the footing member and may be extendible transversely outwardly of the footing member.

Another aspect of this invention provides a support apparatus, comprising an adjustable, vertically extending elevation member terminating at its upper end in an elevated support surface. The elevation member is dimensioned and configured to receive and support at least one of a user's feet, and the elevated support surface is comprised of a cushioning material. The support apparatus further comprises a footing member which supports the elevation member at the end thereof opposite its elevated support surface. The footing member has opposite transverse edges disposed on respective opposite sides of the elevation member, one transverse edge being proximal to, and one transverse edge being remote from, the user of the apparatus. The footing member comprises a sheet material dimensioned and configured to extend beyond the elevation member and provide a surface on which to place the user's unelevated foot. The elevation member is positioned closer to one of the transverse edges of the footing member than to the other so that by rotating the apparatus 180 degrees about a vertical center axis of the footing member, the distance between the elevation member and the transverse edge which is proximal to the user is altered.

The apparatus may further comprise a securement means connected to said footing member for securing said apparatus to a supporting structure.

Other aspects of the present invention will be apparent from the following descriptions.

BRIEF DESCRIPTION OF THE DRAWINGS

FIG. 4 is a plan view of a third embodiment of the present invention including cover means, which are shown in their extended position; and FIG. 5 is an end elevational view of the embodiment of FIG. 4, showing the cover means in their stored position.

DETAILED DESCRIPTION OF THE INVENTION AND SPECIFIC EMBODIMENTS THEREOF

It is often desired for health reasons to elevate one or both extremities of a patient, for example, to elevate a patient's hand, foot or feet and to retain the extremity in the elevated position for a protracted period of time. The support apparatus of the present invention provides an apparatus of this type which is simple in construction, relatively inexpensive to manufacture, which may be conveniently securely fastened to any suitable supporting structure, and which is conveniently positionable for the comfort of the user.

Figure 1A:
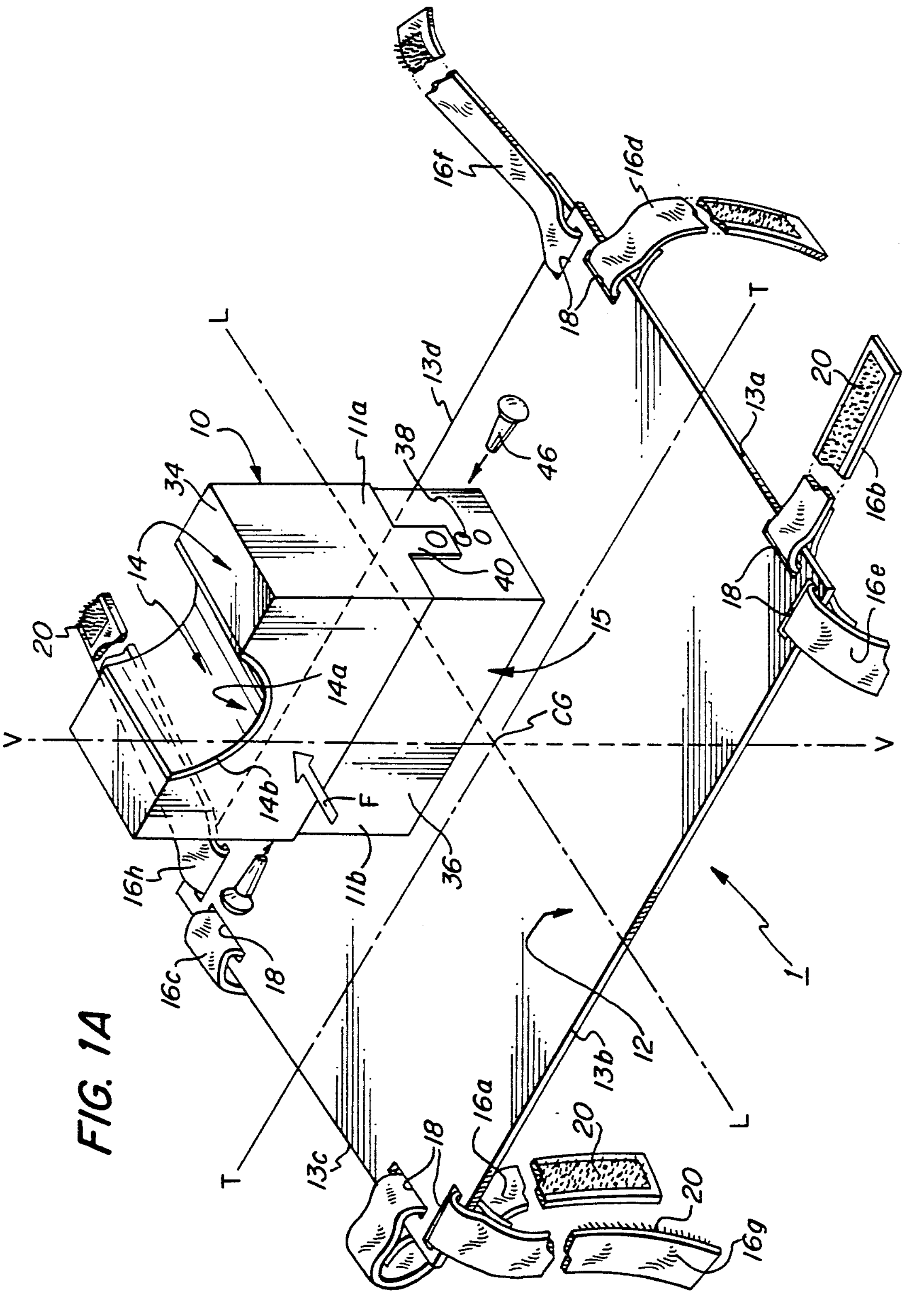
FIG. 1A is a perspective view of one embodiment of the present invention.

Referring now to FIG. 1A, a support apparatus 1 in accordance with one embodiment of the present invention comprises a vertically extending elevation member 10 securely attached by any suitable means to a footing member 12. Alternatively, elevation member 10, or at least the base member portion thereof (described below), may be of integral construction, such as of molded plastic construction. Footing member 12 is a substantially rectangular sheet made of any suitable material, such as a synthetic polymer (plastic), wood, such as a sheet of plywood, a thick sheet of leather, or the like. For example, a plywood sheet may be covered or coated with a vinyl or other suitable plastic covering to provide a smooth, sanitary and easily cleanable surface of footing member 12. Alternatively, footing member 12 may be molded integrally with the base portion of elevation member 10. In any case, footing member 12 is sufficiently thick and rigid to enable elevation member 10 to resist forces tending to topple it over, such as forces applied to it in the direction of the arrow F shown in FIG. 1A.

Figure 1B:
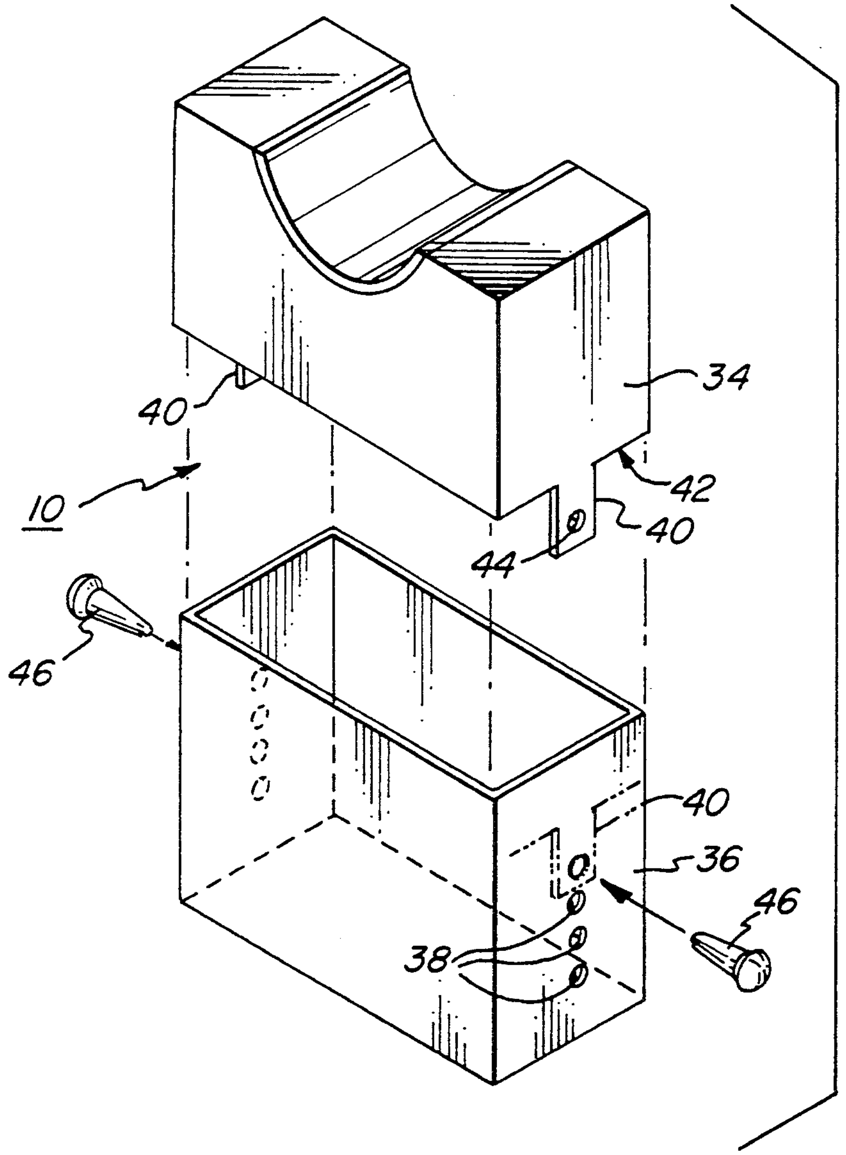
FIG. 1B is an exploded perspective view of the elevation member of FIG. 1A.

Elevation member 10 is substantially block-shaped and made of a rigid material such as wood, rigid plastic or metal. the four sides of elevation member 10 (only two of which, sides 11*a* and 11*b*, are visible in FIG. 1A) extend substantially parallel to respective ones of the four outer edges 13*a*, 13*b*, 13*c* and 13*d* of footing member 12. Edges 13*a* and 13*c* are side edges and edges 13*b* and 13*d* are transverse edges of footing member 12. Sides 11*c* and 11*d* of elevation member 10 are visible in FIG. 2A. Elevation member 10 may be constructed as a monolith, for example, as shown in copending U.S. patent application Ser. No. 07/478,582, which is hereby incorporated by reference, or, may be constructed in two or more telescoping parts to allow the height of the elevation member to be adjustable, as shown in FIG. 1A. Accordingly, elevation member 10 of the instant embodiment comprises two parts, shown for clarity in an exploded view in FIG. 1B: an extension member 34 and a stationary member 36. Extension member 34 and stationary member 36 are mutually adapted to allow sliding engagement of the two members, so that extension member 34 may slide vertically in the direction of vertical axis V, FIG. 1A. To fix the relative vertical position of extension member 34 in relation to stationary member 36, and to thereby adjust the height of this support apparatus for the comfort of the user, stationary member 36 is equipped with a plurality of adjustment holes 38. Preferably, extension member 34 is equipped with a side step 40 which projects downward from the lower edge 42 of extension member 34 and in which there is a securing hole 44 adapted to align with any one of adjustment holes 38 at a variety of relative heights of extension member 34 and stationary member 36. When the user has determined the most comfortable height for extension member 34, and aligned securing hole 44 with the appropriate adjustment hole 38, pegs 46 are inserted coaxially through securing holes 44 and adjustment holes 38 to prevent vertical movement of extension member 34. Preferably, pegs 46 are slightly tapered to allow the user to snugly secure pegs 46 in their respective holes and to remove pegs 46 to change the position of extension member 34 as desired.

Referring again to FIG. 1A, elevation member 10 terminates at its upper end, on extension member 34, in a support surface 14 and at its opposite, lower end, on stationary member 36, in a base portion 15. Support surface 14 has, in the illustrated embodiment, an arcuate-shaped depression 14*a* formed therein, which is dimensioned and configured to receive the extremity of a user's limb, for example, the rear of the ankle in order to elevate the user's foot above the surface of footing member 12. A suitably soft cushioning material 14*b* may be used to line depression 14*a*. Footing member 12 is of sufficient size so as to provide a protective surface covering adjacent to elevation member 10 on which, for example, to place the user's foot which is not being supported on elevation member 10. Footing member 12 therefore serves as both a protective surface for bedclothes, furniture, etc., upon which the user may rest his or her unelevated foot, as well as a stabilizing support of sufficient stiffness to prevent or reduce swaying of elevation member 10. Footing member 12 is generally planar, substantially rectangular, flat construction, so that it may readily lie on a surface which is disposed horizontally or, if tilted, which is closer to horizontal than vertical.

Elevation member 10 is centered on a longitudinal center axis L—L of footing member 12, but is displaced from a transverse center axis T—T of footing member 12. The term "vertical center axis" is defined for use herein and in the claims as an axis which extends perpendicularly to the major planar surfaces of the footing member. Thus, vertical center axis V—V extends perpendicularly to the major surfaces of footing member 12 and intersects footing member 12 at the center of gravity CG thereof. Footing member 12 is seen to extend from the base portion 15 of elevation member 10 outwardly thereof so that it serves to stabilize support apparatus 1, i.e., to resist toppling forces such as that indicated by the arrow F, acting on elevation member 10.

Securement means comprising, in the illustrated embodiment, paired straps 16*a*–16*b*, 16*c*–16*d*, 16*e*–16*f* and 16*g*–16*h* are coupled to footing member 12 by means of a plurality of apertures 18 located about the perimeter of footing member 12. The securement means 16*a*–16*h* may include cloth fasteners 20 (such as hook and loop fasteners of the type sold under the trademark VELCRO®) for easy connection/disconnection of the support apparatus 1 to any supporting structure, for example, to a bed, footstool, chaise lounge or reclining chair. Cloth fasteners 20 are secured to the straps 16*a*–16*h* starting at the distal (free) ends thereof, and are located on opposite facing sides of opposed strap pairs 16*a*–16*b*, 16*c*–16*d*, etc., which are aligned with each other whereby engagement of the cloth fasteners 20 of each of the opposed strap pairs 16*a*–16*b*, etc., may be conveniently made, as illustrated in FIG. 2A.

Figure 1C:
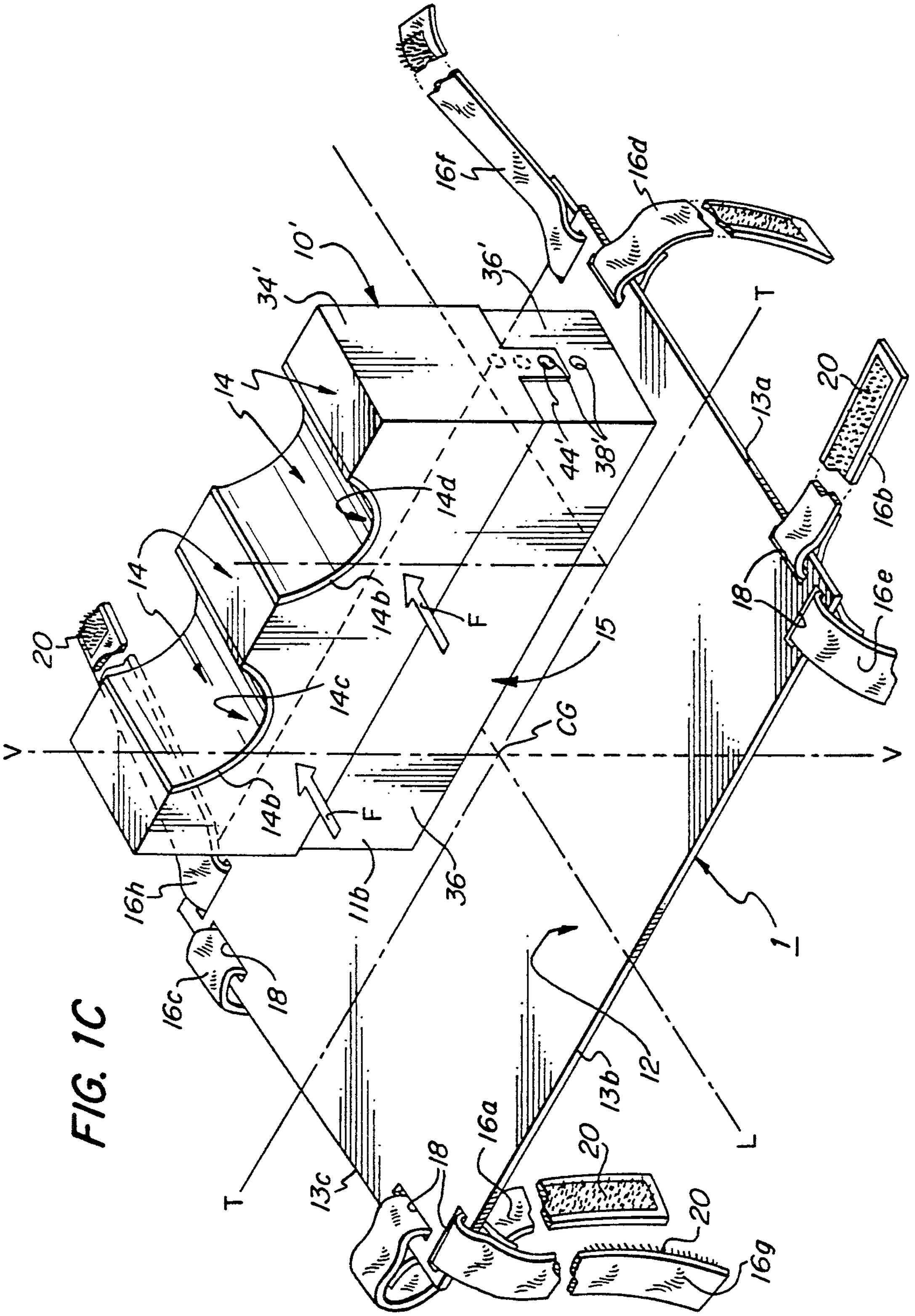
FIG. 1C is a perspective view of an alternate embodiment of the present invention, adapted to receive two feet simultaneously.

According to another aspect of this invention, support surface 14 of elevation member 10 may be equipped with a pair of arcuate depressions 14*c*, 14*d*, FIG. 1C, to accommodate two of the user's extremities simultaneously. For example, it may be desirable to elevate both of a user's feet for therapeutic or relaxation purposes. As with the embodiment shown in FIG. 1A, elevation member 10′ of FIG. 1C may be constructed as a monolith or as an adjustable apparatus having telescoping parts, i.e., an extension member 34′ and a stationary member 36′ equipped with adjustment means such as adjustment holes 38′ and securing hole 44′ by which, through the use of a peg, the height of elevation member 10′ may be varied.

Figure 2A:
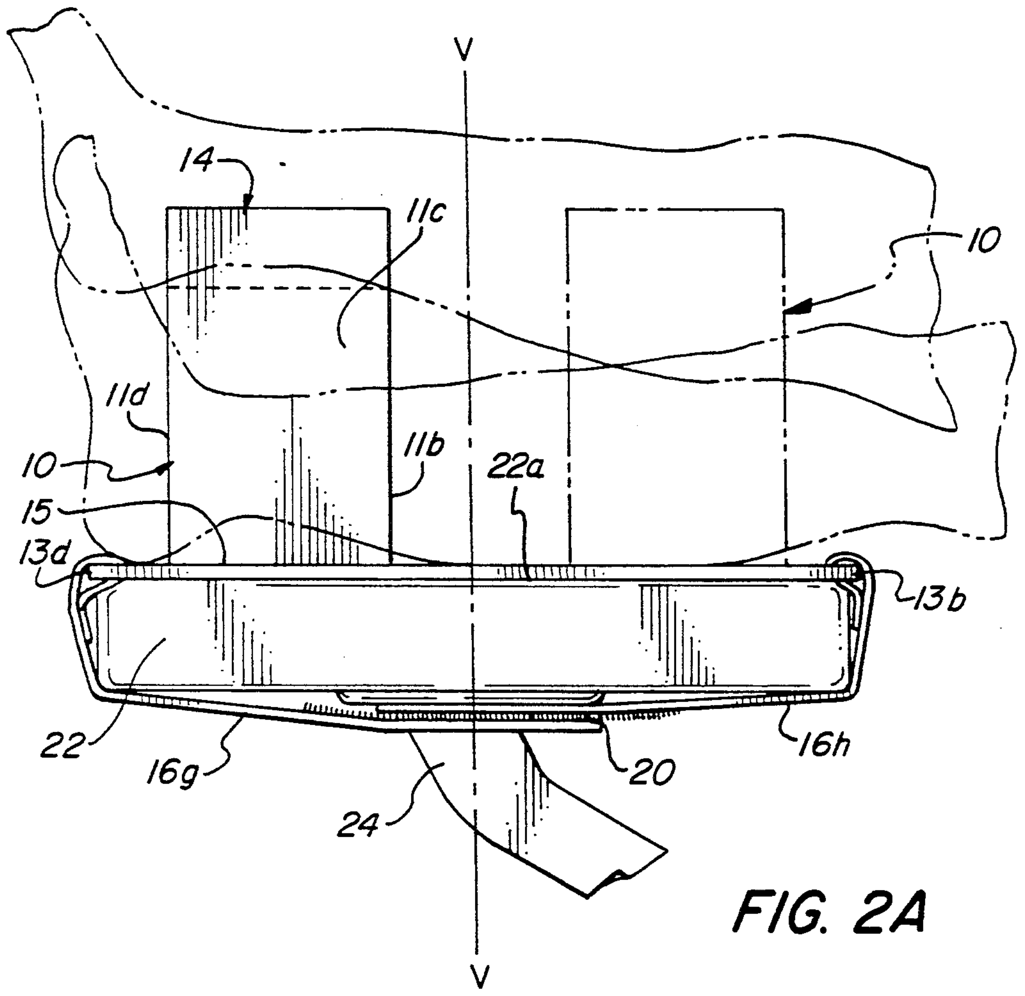
FIG. 2A is a side elevational view of the embodiment of FIG. 1A fastened to a supporting structure.

FIG. 2A shows the support apparatus 1 secured to a suitable supporting structure comprising a footrest 22 of a reclining chair (not shown). Footrest 22, which is shown in side view elevation, is supported by a support member 24 which extends from the bottom of footrest 22 to the seat portion of a reclining chair (not shown). The user of the support apparatus 1 would be seated upon the seat of the reclining chair (not shown) located to the right of footrest 22 as viewed in FIG. 2A, the lower portion of the user's legs being shown in phantom outline in FIG. 2A. When in use as shown in FIG. 2A, transverse edge 13*b* is proximal to the user and transverse edge 13*d* is remote from the user. If rotated to place elevation member 10 in the position thereof shown in phantom outline, transverse edge 13*d* would be proximal to, and transverse edge 13*b* would be remote from the user.

Support apparatus 1 is mounted upon footrest 22 by placing footing member 12 upon the horizontal, or nearly so, top surface 22*a* of footrest 22 and fastening it in place thereon by means of straps 16*a*–16*h*, which are wrapped about footrest 22 and fastened together by engagement of cloth fasteners 20, as illustrated. In this position, a user of the support apparatus 1, while seated in the chair (not shown) of which footrest 22 forms a part, may place one foot within arcuate depression 14*a* of support surface 14 as illustrated in FIG. 2A in order to support that foot and leg in an elevated position. The user's other foot may rest upon footing member 12. Footing member 12 thus not only supports elevation member 10 but protects footrest 22 from the patient's other (unelevated) foot. The user may therefore, if desired, retain his or her shoe on the unelevated foot without fear of marring or damaging the surface 22*a* of the footrest 22. Similarly, support apparatus 1 may be supported at the foot of a bed by wrapping selected ones of straps 16*a*–16*h* about the mattress or about the mattress plus its supporting frame or box spring. For this purpose, straps 16*a*–16*h* are desirably made long enough to accommodate supporting structures of quite different size. Straps 16*a*–16*h* may therefore be made in whole or part of an elastic material in order to be stretched to accommodate larger size supporting structures, may be supplied with conventional buckles which enable doubling lengths of the straps upon themselves to provide for adjusting the effective length of the straps, and/or may be supplied with extension straps which may be selectively fastened thereto. For use upon a structure such as footrest 22, all the strap pairs 16*a*–16*b* through 16*g*–16*h* may be utilized or only strap pairs 16*a*–16*b* and 16*c*–16*d* or only 16*e*–16*f* and 16*g*–16*h* may be utilized. As illustrated in FIG. 2A, only strap pairs 16*e*–16*f* and 16*g*–16*h* are utilized: only pair 16*g*–16*h* are visible in FIG. 2A, pair 16*e*–16*f* being hidden from view by pair 16*g*–16*h*. Strap pairs 16*a*–16*b* and 16*c*–16*d* have been omitted from the drawing of FIG. 2A and may be removed from footing member 12 or left dangling in place, as desired.

When used on a bed mattress, strap pairs 16*a*–16*b* and 16*c*–16*d* would normally be utilized to extend transversely about the mattress near the foot of the bed, and strap pairs 16*e*–16*f* and 16*g*–16*h* would not be utilized and would usually be removed or folded under footing member 12 for the user's comfort.

Figure 2B:
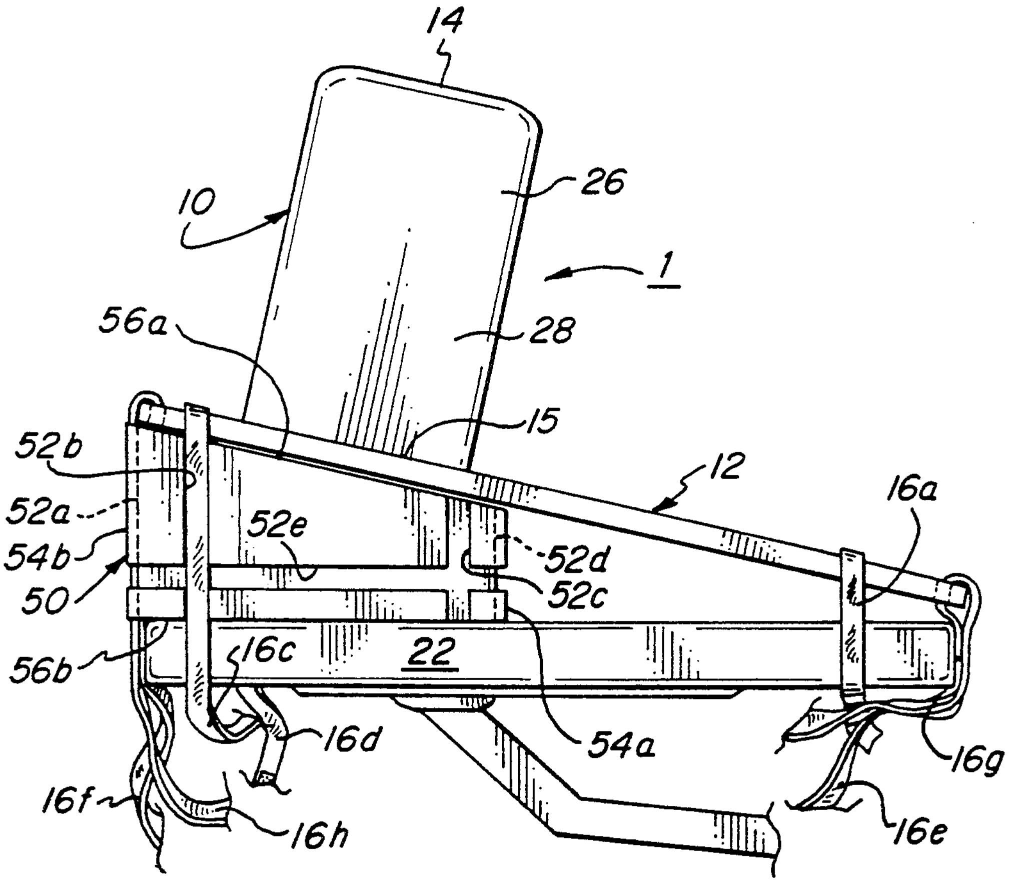
FIG. 2B is a side elevational view of the support apparatus of FIG. 2A including an adjustment wedge according to one embodiment of this invention.

In some instances it may be desirable for the elevation member to be raised or tilted or both in relation to the supporting structure on which it rests. For this purpose, the extremity support apparatus according to this invention may include an adjustment wedge 50, FIG. 2B, disposed between footing member 12 and, for example, supporting footrest 22. In cross section, wedge 50 preferably has a trapezium configuration (i.e., a quadrilateral with no parallel sides) and different height and depth dimensions so that the user can rotate wedge 50 and impart various angles and heights to the support apparatus, although a trapezoidal (two parallel sides) or parallelogram (two pairs of parallel sides) cross section may be used. Otherwise, wedge 50 may be generally rectangular in the orthogonal top, bottom, front and back views. To help secure wedge 50 in place beneath footing member 12, wedge 50 is equipped with surface recesses 52*a*, 52*b*, 52*c*, 52*d*, 52*e* and others (not shown) which are adapted to receive those of straps 16*a*–16*h* as they are used to secure elevation member 10 via footing member 12 to footrest 22, and as they are disposed in contact with wedge 50. As shown in FIG. 2B, recess 52*a* receives strap 16*h* and recess 52*b* receives strap 16*c*; similar recesses (not shown) receive straps 16*d* and 16*f*, while, due to the orientation of wedge 50, recesses 52*c*, 52*d* and 52*e* are vacant. In this way, the straps simultaneously secure footing member 12 to footrest 22 and secure the position of wedge 50 beneath footing member 12. Wedge 50 is shown with low elevation surfaces 56*a* and 56*b* in contact with footing member 12 and footrest 22 resulting in a low elevation, but wedge 50 can be turned upright to attain a different angle or greater height established between high elevation surfaces 54*a* and 54*b*, if desired. In an alternative embodiment, internal passages may be formed in wedge 50 to accommodate the straps instead of surface recesses. Regardless of whether recesses or internal passages accommodate the straps, wedge 50 is securable in position in either the low elevation or high elevation positions.

The reason for elevation member 10 being displaced from transverse center axis T—T of footing member 12 is to permit shifting the location of elevation member 10 relative to the user in a manner as depicted in FIG. 2A. To shift the location of elevation member 10, support apparatus 1 is rotated 180 degrees about vertical center axis V—V of footing member 12, thus moving elevation member 10 from its position indicated by solid lines in FIG. 2A, to its alternate position shown in phantom lines in FIG. 2A. By alternating the elevation member 10 between these two illustrated positions, the user can change the distance of elevation member 10 relative to the transverse edge (13*b* or 13*d*) of footing member 12 which faces the user. This enables adjusting the position of elevation member 10 relative to the seat of the chair (not shown) occupied by the user to accommodate users of different height or, more specifically, users of different leg length. Although the same effect could be attained by shifting the entire support apparatus 1 towards or away from the user, such shifting is not always feasible. For example, in the case as illustrated in FIG. 2A, the supporting structure, footrest 22, is not long enough to accommodate such shifting of the support apparatus 1. Thus, the rotation of the support apparatus about the vertical center axis V—V of its footing member 12 accomplishes the shifting of the position of elevation member 10 with the vertical center axis V—V of footing member 12 remaining fixed.

Figure 3:
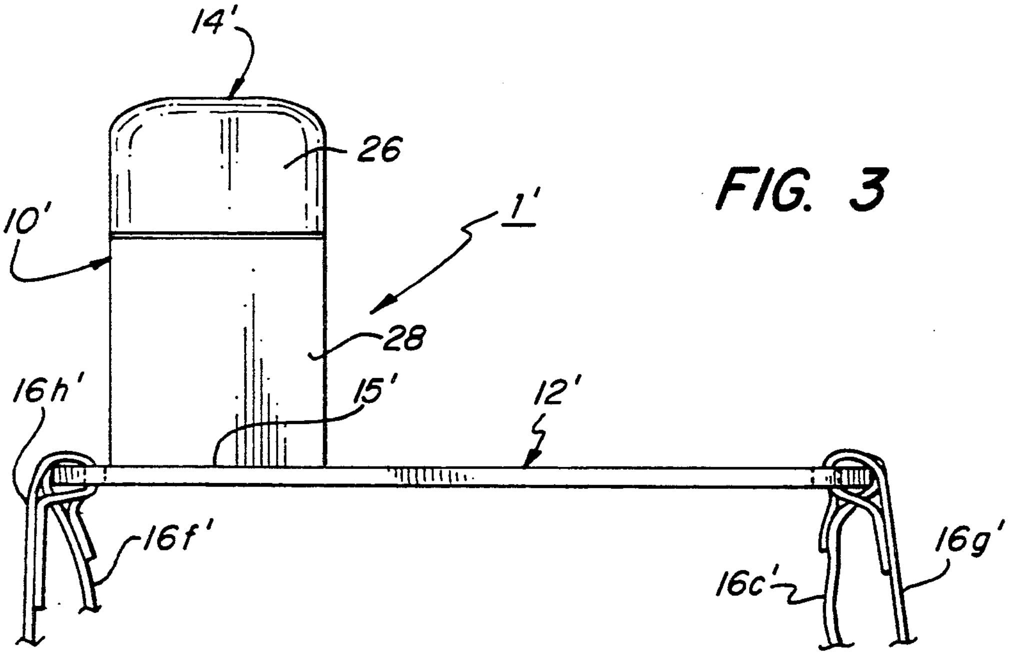
FIG. 3 is a side elevational view of another embodiment of the present invention.

Referring to the embodiment depicted in FIG. 3, parts thereof which correspond to the embodiment of FIGS. 1A and 2A are identically numbered except for the indication of a prime indicator thereto. Accordingly, FIG. 3 depicts a support apparatus 1' comprising a footing member 12' and having attached thereto securement means comprising strap pairs 16*e'*-16*f'* and 16*g'*-16*h'*. An elevation member 10' is secured by its base portion 15' to footing member 12' and terminates at its upper end in an elevation support surface 14'. In the embodiment illustrated in FIG. 3, elevation member 10' comprises rigid base member 28 and a soft top pad 26. Preferably, approximately one half to two thirds of the lower portion of the height of elevation member 10' is comprised of rigid base member 28, and the remaining top portion is comprised of soft top pad 26 which serves as a cushioning material. Soft top pad 26 is resilient, substantially block-shaped, and automatically conforms to the shape of the user's extremity (i.e., foot, leg, or arm).

Referring now to FIGS. 4 and 5, there is illustrated yet another embodiment of the support apparatus of the present invention in which parts corresponding to those of the embodiments of FIGS. 1A and 2A are identically numbered but with the addition of a double prime indicator thereto. Thus, there is shown in FIGS. 4 and 5 a support apparatus 1'' comprising a footing member 12'' which supports an elevation member 10'' which has a support surface 14'' having therein an arcuate depression (best seen in FIG. 5) 14*a''*. In this embodiment, securement means are provided by strap pairs 16*a''*-16*b''* and 16*c''*-16*d''*. Each of the straps of the strap pairs contains cloth fasteners 20''. The embodiments illustrated in FIGS. 4 and 5 further comprise a pair of cover sheets 30*a*, 30*b* made of gatherable material for providing an extendible cover to protect larger support structures (e.g., beds) upon which support apparatus 1'' may be placed for the use of a person lying on the bed. A plan view of the foot of a mattress of the bed on which the apparatus 1'' is used is shown in phantom outline in FIG. 4. The strap pairs 16*a''*-16*b''* and 16*c''*-16*d''* are shown in extended position and, in order to secure support apparatus 1'' to the mattress, would be wrapped around the mattress and secured to each other beneath the mattress. Cover sheet 30*a* is seen to extend from side edge 13*c''* of footing member 12'' whereas cover sheet 30*b* extends from side edge 13*a''* of footing member 12''. Although in FIG. 4 support apparatus 1'' is shown substantially centered on the width of the mattress M, it may be positioned off-set slightly either to the left or the right, the better to accommodate either the left or right leg of the user. Such an off-set position is particularly advantageous when using the embodiment of this invention adapted to support both of the user's legs but where comfort or medical necessity requires that only one leg be elevated. Cover sheets 30*a* and 30*b* are thus seen to protect the mattress or other supporting structure from being marred in case the user should decide to keep a shoe or other foot covering on the unelevated foot. When the support apparatus 1'' is being used on a smaller supporting structure, such as the footrest 22 of FIG. 2A, cover sheets 30*a*, 30*b* may be folded under footing member 12'' as shown in FIG. 5. Suitable fasteners such as snaps 21 may be provided to hold cover sheets 30*a*, 30*b* in their folded position for convenient transport of the device.

The above description of specific embodiments of the present invention should not be construed as limiting the scope of the invention. It will be apparent that upon a reading and understanding of the foregoing, numerous variations to the specific embodiments may occur to those skilled in the art which variations nonetheless lie within the spirit of the invention and the scope of the appended claims. For example, in any of the foregoing embodiments, the elevation member may be monolithic and therefore have a fixed height, or may be adjustable, having a stationary member, a movable member, and adjustment means such as adjustment holes, a securing hole, and a peg. Any other suitable adjustment means for securing the height of the elevation member may also be used. The elevation member may be adapted to receive either one or both of a user's extremities. Further, the securement means may comprise cloth fasteners of the type sold under the trademark Velcro® which are attached to the bottom of footing member 12 for gripping the fabric of bedclothes, footrests, footstools and the like. However, securement means such as the straps illustrated are preferred in the sense that they provide a positive locking engagement with the supporting structure. For another variation, the elevation member 10 may be configured to have more than one depression formed in the support surface 14 thereof to accommodate more than one extremity (e.g., foot).

What is claimed is:

1. A support apparatus for supporting at least one of a user's extremities in an elevated position, the apparatus comprising:

a vertically extending elevation member terminating at its lower end in a base portion and at its upper end in an elevated support surface dimensioned and configured to receive at least one extremity of the user at an elevation above a footing member, defined below;

a footing member extending transversely of and outwardly from the base portion of the elevation member to stabilize the footing of the elevation member; and securement means attached to the support apparatus, the securement means being dimensioned and configured to fasten the support apparatus to a supporting structure.

2. The support apparatus of claim 1 wherein the elevation member comprises a stationary member and an extension member, whereby the effective height of the apparatus may be adjusted.

3. A support apparatus for supporting at least one of a user's extremities in an elevated position, the apparatus comprising:

a vertically extending elevation member terminating at its lower end in a base portion and at its upper end in an elevated support surface dimensioned and configured to receive at least one extremity of the user at an elevation above a footing member, defined below;

a footing member extending transversely outwardly of the elevation member from the base portion thereof, the footing member having a vertical center axis and opposite transverse edges disposed on respective opposite sides of the elevation member, one transverse edge being proximal to, and one transverse edge being remote from, the user of the apparatus;

the elevation member being located closer to one of the transverse edges than the other, whereby, by rotating the apparatus 180 degrees about the vertical center axis of the footing member, the distance between the elevation member and the transverse edge which is proximal to the user is altered.

4. The support apparatus of claim 8 further comprising securement means attached to the support apparatus, the securement means being dimensioned and configured to fasten the apparatus to a supporting structure.

5. The support apparatus of claim 3 wherein the elevation member comprises a stationary member and an extension member, whereby the effective height of the apparatus may be adjusted.

6. The support apparatus of claim 1 or claim 4 wherein the securement means are attached to the footing member.

7. The support apparatus of claim 1 or claim 4 wherein the securement means comprise a plurality of straps having mating connectors thereon.

8. The support apparatus of claim 2 or claim 5 further comprising a cover means comprising a gatherable sheet material attached to the support apparatus and extendible outwardly of the footing member whereby to cover, at least in the vicinity of the apparatus, a supporting structure on which the apparatus is placed.

9. The support apparatus of claim 3 wherein the cover means is attached to the footing member and is extendible transversely outwardly of the footing member.

10. The support apparatus of claim 2 or claim 5 wherein the extension member comprises a substantially block-shaped member, and the elevated support surface thereof is in the shape of a single arcuate depression for receiving one of the user's extremities.

11. The support apparatus of claim 2 or claim 5 wherein the extension member comprises a substantially block-shaped member, and the elevated support surface thereof is in the shape of a dual arcuate depression for receiving two of the user's extremities.

12. A support apparatus for supporting at least one of a user's extremities in an elevated position, the apparatus comprising:

a vertically extending elevation member terminating at its lower end in a base portion and at its upper end in an elevated support surface dimensioned and configured to receive at least one extremity of the user;

a footing member extending transversely outwardly of the elevation member from the base portion thereof, the footing member having a vertical center axis and opposite transverse edges disposed on respective opposite sides of the elevation member, one transverse edge being proximal to, and one transverse edge being remote from, the user of the apparatus; and an adjustment wedge member dimensioned and configured to be interposed between the footing member and the supporting structure.

13. The support apparatus of claim 12 wherein the wedge member is equipped with recesses to receive the securing means.

14. The support apparatus of claim 12 or claim 13 wherein the wedge member has a nonrectangular quadrilateral cross section.

15. The extremity support apparatus of claim 12 wherein the elevation member being located closer to one of the transverse edges than the other, whereby, by rotating the apparatus 180 degrees about the vertical center axis of the footing member, the position of the elevation member relative to the user is altered.

16. A support apparatus for providing an elevated support to at least one of a user's feet, the apparatus comprising:

an adjustable vertically extending elevation member terminating at its upper end in an elevated support surface which is dimensioned and configured to receive and support at least one of a user's feet at an elevation above a footing member, defined below, the elevated support surface being comprised of a cushioning material; and a footing member on which the elevation member is supported at the end thereof opposite its elevated support surface, the footing member having opposite transverse edges disposed on respective opposite sides of the elevation member, one transverse edge being proximal to, and one transverse edge being remote from, the user of the apparatus, the footing member being comprised of a sheet material dimensioned and configured to extend beyond the elevation member and provide a surface on which to place the user's unelevated foot, the elevation member being closer to one of the transverse edges than to the other whereby, by rotating the apparatus 180 degrees about a vertical center axis of the footing member, the distance between the elevation member and the transverse edge which is proximal to the user is altered.

17. The support apparatus of claim 16 wherein the elevation member comprises a stationary member which rests on the footing member and an extension member dimensioned and configured to move vertically with respect to the stationary member.

18. The support apparatus of claim 16 or claim 17 further including cover means comprising one or more sheets of gatherable material attached to the footing member and extendible outwardly thereof.

19. The extremity support apparatus of claim 12 or claim 15 further including securement means attached to the support apparatus, the securement means being dimensioned and configured to fasten the apparatus to a supporting structure.

20. The extremity support apparatus of claim 1, claim 3, claim 12 or claim 16 wherein the elevated support surface is dimensioned and configured to receive two extremities side by side.

* * * * *

UNITED STATES PATENT AND TRADEMARK OFFICE
CERTIFICATE OF CORRECTION

PATENT NO. : 5,149,033

DATED : SEPTEMBER 22, 1992

INVENTOR(S) : DONALD R. BURZLER

It is certified that error appears in the above-identified patent and that said Letters Patent is hereby corrected as shown below:

In column 4, line 56, "is generally" should read --is of generally--.

In column 5, line 17, "chaise lounge" should read --chaise longue--.

Claim 4, column 9, line 38, should read --4. The support apparatus of claim 3...--.

Claim 9, column 9, line 58, should read --9. The support apparatus of claim 8...--.

Signed and Sealed this

Ninth Day of November, 1993

*Attest:*

BRUCE LEHMAN

*Attesting Officer*

*Commissioner of Patents and Trademarks*